US011903004B2

(12) United States Patent
Tang et al.

(10) Patent No.: US 11,903,004 B2
(45) Date of Patent: Feb. 13, 2024

(54) DATA TRANSMISSION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/500,822

(22) Filed: Oct. 13, 2021

(65) Prior Publication Data

US 2022/0070871 A1 Mar. 3, 2022

Related U.S. Application Data

(63) Continuation of application No. 16/471,529, filed as application No. PCT/CN2016/111732 on Dec. 23, 2016, now Pat. No. 11,166,283.

(51) Int. Cl.
*H04W 72/04* (2023.01)
*H04L 5/00* (2006.01)
(Continued)

(52) U.S. Cl.
CPC ........... *H04W 72/53* (2023.01); *H04L 5/0094* (2013.01); *H04W 72/0453* (2013.01); *H04W 72/1263* (2013.01)

(58) Field of Classification Search
CPC ......... H04W 72/0493; H04W 72/0453; H04W 72/1263; H04L 5/0094; H04L 5/0092; H04L 5/0091; H04L 5/0096
See application file for complete search history.

(56) References Cited

U.S. PATENT DOCUMENTS 9,445,406 B2 9/2016 Suzuki et al.
10,644,818 B2 5/2020 Yi et al.
(Continued)

FOREIGN PATENT DOCUMENTS

CN 101291512 A 10/2008
CN 101442381 A 5/2009
(Continued)

OTHER PUBLICATIONS

Second Office Action of the Australian application No. 2016432994, dated Feb. 1, 2022.
(Continued)

*Primary Examiner* — Phong La
(74) *Attorney, Agent, or Firm* — Ladas & Parry, LLP

(57) ABSTRACT

Disclosed are a data transmission method, a network device and a terminal device. The method comprises: sending resource configuration information to a terminal device, wherein the resource configuration information is used to indicate a plurality of resource sub-bands for transmitting data in a scheduling unit, each resource sub-band in the plurality of resource sub-bands is composed of continuous physical resource blocks in a frequency domain, and at least two resource sub-bands in the plurality of resource sub-bands have different sub-carrier intervals; and transmitting the data with the terminal device on the plurality of resource sub-bands. By means of the method, the network device and the terminal device of the embodiments of the present invention, it can be realized that the same terminal device uses a resource with different sub-carrier intervals to transmit data in one scheduling unit.

16 Claims, 4 Drawing Sheets

US 11,903,004 B2
Page 2

(51) Int. Cl.
  *H04W 72/53* (2023.01)
  *H04W 72/0453* (2023.01)
  *H04W 72/1263* (2023.01)

(56) References Cited

U.S. PATENT DOCUMENTS

| | | | |
|---|---|---|---|
| 2011/0267996 | A1 | 11/2011 | Guan |
| 2013/0100888 | A1 | 4/2013 | Shimezawa |
| 2015/0256306 | A1 | 9/2015 | Kim et al. |
| 2015/0327287 | A1 | 11/2015 | Kim et al. |
| 2015/0365926 | A1 | 12/2015 | Long |
| 2016/0066321 | A1 | 3/2016 | Yu |
| 2016/0182201 | A1 | 6/2016 | Jiang et al. |
| 2016/0330000 | A1 | 11/2016 | Lee et al. |
| 2017/0164226 | A1 | 6/2017 | Wei |
| 2017/0164350 | A1 | 6/2017 | Sun |
| 2017/0332359 | A1* | 11/2017 | Tsai .................... H04W 72/046 |
| 2018/0007673 | A1 | 1/2018 | Fwu et al. |
| 2018/0049182 | A1 | 2/2018 | Luo et al. |
| 2018/0092002 | A1 | 3/2018 | Manolakos et al. |
| 2018/0124790 | A1 | 5/2018 | Yerramalli |
| 2018/0139778 | A1 | 5/2018 | Chou |
| 2018/0199341 | A1* | 7/2018 | Baldemair ............ H04L 5/0091 |
| 2018/0255540 | A1 | 9/2018 | Nakashima et al. |
| 2019/0007152 | A1 | 1/2019 | Yi et al. |
| 2019/0007181 | A1 | 1/2019 | Marinier et al. |
| 2019/0013982 | A1 | 1/2019 | Sun |
| 2019/0058551 | A1 | 2/2019 | Li |
| 2019/0208482 | A1 | 7/2019 | Tooher et al. |
| 2019/0229880 | A1 | 7/2019 | Lin |
| 2019/0357213 | A1 | 11/2019 | Cai et al. |
| 2020/0029308 | A1 | 1/2020 | Tiirola et al. |
| 2020/0059893 | A1 | 2/2020 | Liu |
| 2020/0107308 | A1 | 4/2020 | Liao et al. |

FOREIGN PATENT DOCUMENTS

| | | |
|---|---|---|
| CN | 101772170 A | 7/2010 |
| CN | 102761513 A | 10/2012 |
| CN | 103166882 A | 6/2013 |
| CN | 104885539 A | 9/2015 |
| CN | 105099634 A | 11/2015 |
| CN | 105308884 A | 2/2016 |
| CN | 103957030 B | 5/2016 |
| CN | 107889238 A | 4/2018 |
| EP | 2393233 B1 | 1/2013 |
| EP | 3324697 A1 | 5/2018 |
| EP | 3490316 A1 | 5/2019 |
| EP | 3506524 A1 | 7/2019 |
| EP | 3518572 A1 | 7/2019 |
| JP | 2011142494 A | 7/2011 |
| RU | 2533185 C1 | 11/2014 |
| WO | 2016004634 A1 | 1/2016 |
| WO | 2016033386 A1 | 3/2016 |
| WO | 2016130175 A1 | 8/2016 |
| WO | 2016138666 A1 | 9/2016 |
| WO | 2016141989 A1 | 9/2016 |
| WO | 2016184190 A1 | 11/2016 |

OTHER PUBLICATIONS

Second Office Action of the European application No. 16924587.5, dated Mar. 30, 2022.
First Office Action of the Chinese application No. 202011385859.0, dated May 23, 2022.
First Office Action of the Mexican application No. MX/a/2019/007569, dated Jun. 27, 2022.
International Search Report in international application No. PCT/CN2016/111732, dated Aug. 29, 2017 (considered in parent U.S. Appl. No. 16/471,529).
Written Opinion of the International Search Authority in international application No. PCT/CN2016/111732, dated Aug. 29, 2017 (considered in parent U.S. Appl. No. 16/471,529).
Zte et al: "Frequency multiplexing of numerologies", 3GPP Draft; R1-166492—Frequency Multiplexing of Numeologies, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016 (Aug. 21, 2016), XP051140260, [retrieved on Aug. 21, 2016], the whole document, (considered in parent U.S. Appl. No. 16/471,529).
Supplementary European Search Report in the European application No. 16924587.5, dated Nov. 19, 2019 (considered in parent U.S. Appl. No. 16/471,529).
English translation of the Written Opinion of the International Search Authority in the international application No. PCT/CN2016/111732, dated Aug. 29, 2017 (considered in parent U.S. Appl. No. 16/471,529).
First Office Action of the Chinese application No. 201680091676.3, dated Apr. 10, 2020 (considered in parent U.S. Appl. No. 16/471,529).
Written Opinion of the Singaporean application No. 11201905576W, dated Jun. 2, 2020 (considered in parent U.S. Appl. No. 16/471,529).
First Office Action of the Chilean application No. 201901754, dated Apr. 20, 2020 (considered in parent U.S. Appl. No. 16/471,529).
First Office Action of the Russian application No. 2019122778, dated Apr. 16, 2020 (considered in parent U.S. Appl. No. 16/471,529).
Huawei, HiSilicon, "Discussion on resource allocation and indication on NR", 3GPP TSG RAN WG1 Meeting #87 R1-1611661, Reno, Nevada, USA, Nov. 14-18, 2016 (considered in parent U.S. Appl. No. 16/471,529).
Second Office Action of the Chinese application No. 201680091676.3, dated Jul. 13, 2020 (considered in parent U.S. Appl. No. 16/471,529).
First Office Action of the Canadian application No. 3047346, dated Jul. 16, 2020 (considered in parent U.S. Appl. No. 16/471,529).
Second Office Action of the Chilean application No. 201901754, dated Aug. 17, 2020 (considered in parent U.S. Appl. No. 16/471,529).
Panasonic: "Scheduling considerations for dynamic resource sharing among numerologies in NR", 3GPP Draft; R1-1612798, 3GPP, Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051176740, Retrieved from the Internet: URL:http://www.3gpp.org/ftp/Meetings_3GPP_SYNC/RAN1/Docs/ [retrieved on Nov. 13, 2016], entire document (considered in parent U.S. Appl. No. 16/471,529).
First Office Action of the Brazilian application No. BR1120190129413, dated Sep. 24, 2020(considered in parent U.S. Appl. No. 16/471,529).
First Office Action of the European application No. 16924587.5, dated Oct. 29, 2020 (considered in parent U.S. Appl. No. 16/471,529).
Office Action of the Indian application No. 201917026633, dated Nov. 2, 2020 (considered in parent U.S. Appl. No. 16/471,529).
First Office Action of the Japanese application No. 2019-533575, dated Dec. 18, 2020 (considered in parent U.S. Appl. No. 16/471,529).
Second Written Opinion of the Singaporean application No. 11201905578W, dated Feb. 22, 2021 (considered in parent U.S. Appl. No. 16/471,529).
Second Office Action of the Canadian application No. 3047346, dated Apr. 19, 2021 (considered in parent U.S. Appl. No. 16/471,529).
First Office Action of the Taiwanese application No. 106142293, dated Apr. 23, 2021 (considered in parent U.S. Appl. No. 16/471,529).
First Office Action of the Israel application No. 267415, dated May 30, 2021 (considered in parent U.S. Appl. No. 16/471,529).
First Office Action of the Indonesian application No. P00201906285, dated Jul. 27, 2021 (considered in parent U.S. Appl. No. 16/471,529).
Second Office Action of the Japanese application No. 2019-533575, dated Sep. 10, 2021 (considered in parent U.S. Appl. No. 16/471,529).
First Office Action of the Australian application No. 2016432994, dated Sep. 20, 2021.
Second Office Action of the Chinese application No. 202011385859.0, dated Sep. 20, 2022 with machine translation by Global Dossier.
First Office Action of the corresponding Malaysian patent application No. PI 2019003607, dated Jul. 13, 2023.
Title: "NR Time domain structure: subframe, slot and mini-slot and time interval," 3GPP TSG RAN WG1 #86bis R1-1608765, Lisbon, Portugal, Oct. 10-14, 2016, Agenda item:8.1.2.2, Source: CATT, Document for: Discussion and Decision, the whole document.

(56) References Cited

OTHER PUBLICATIONS

Title: "Resource allocation for larger PDSCH/PUSCH channel bandwidth," 3GPP TSG RAN WG1 Meeting #87 R1-1612596, Reno, USA Nov. 14-18, 2016, Source: ZTE, Agenda item: 6.2.8.1.4, Document for: Discussion and Decision, the whole document.
First Office Action of the corresponding Korean patent application No. 10-2019-7018235, dated Sep. 22, 2023 with English translation.

* cited by examiner

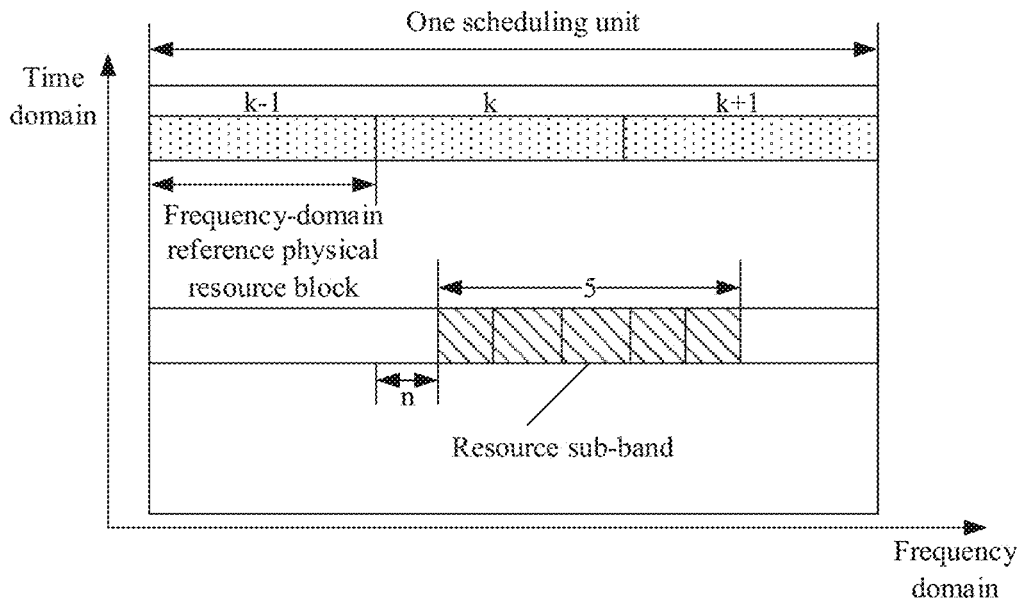

Resource allocation information sent by a network device is received, the resource configuration information is configured to indicate multiple resource sub-bands for transmitting data in a scheduling unit, each of the multiple resource sub-bands is formed by continuous physical resource blocks in a frequency domain and at least two resource sub-bands in the multiple resource sub-bands have different subcarrier spacings ~210

The data is communicated with the network device according to the resource allocation information ~220

FIG. 6

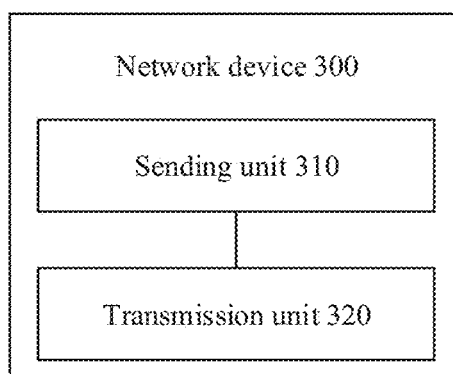

FIG. 7

DATA TRANSMISSION METHOD, NETWORK DEVICE AND TERMINAL DEVICE

CROSS-REFERENCE TO RELATED APPLICATIONS

This application is a continuation application of U.S. patent application Ser. No. 16/471,529 filed on Jun. 19, 2019, which is the U.S. national phase of PCT Application No. PCT/CN2016/111732 filed on Dec. 23, 2016, the disclosures of which are incorporated herein by reference in their entireties.

TECHNICAL FIELD

The disclosure relates to the field of communication, and more particularly to a data transmission method, a network device and a terminal device.

BACKGROUND

In an existing Long Term Evolution (LTE) system, all resources for data transmission are allocated based on a same subcarrier spacing, which is unable to meet a multiplexing requirement of different subcarriers in a 5th-Generation (5G) system.

SUMMARY

In view of this, the disclosure provide a data transmission method, a network device and a terminal device, which may enable the same terminal device to perform transmission of data by use of resources with different subcarrier spacings in a scheduling unit.

A first aspect provides a data transmission method, which may include the following operations. Resource configuration information is sent to a terminal device. The resource configuration information is configured to indicate multiple resource sub-bands for transmitting data in a scheduling unit, each of the multiple resource sub-bands is formed by continuous physical resource blocks on a frequency domain and at least two resource sub-bands in the multiple resource sub-bands have different subcarrier spacings. The data is communicated with the terminal device on the multiple resource sub-bands.

The scheduling unit may indicate one or more resource blocks with a certain width in the frequency domain, and is not limited in a time domain. The frequency-domain scheduling unit may occupy the whole system bandwidth and may also occupy part of the system bandwidth, and a minimum width of the frequency-domain scheduling unit is a basic physical resource block.

The resource sub-band may be formed by continuous physical resource blocks with the same frequency-domain width, and may also be formed by discontinuous physical resource blocks with the same frequency-domain width.

The resource sub-bands with different subcarrier spacings are configured for the terminal device to transmit the data in the scheduling unit, so that localized continuous frequency-domain resources allocation with multiple attributes may be supported better.

In a possible implementation mode, the resource configuration information may include first position indication information. The first position indication information may be configured to indicate a position of a first resource sub-band in the multiple resource sub-bands on the frequency domain.

The resource configuration information includes position indication information corresponding to each resource sub-band, and the resource configuration information may further include a parameter configured to indicate the number of the resource sub-bands allocated for the terminal device.

In a possible implementation mode, the first position indication information may include first indication information and second indication information. The first indication information may be configured to indicate frequency-domain reference physical resource blocks including the first resource sub-band on the frequency domain in the scheduling unit, and a subcarrier spacing of each frequency-domain reference physical resource block may be a multiple of a maximum subcarrier spacing preconfigured by a system. The second indication information may be configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

The frequency-domain reference physical resource block may be a unit for virtually dividing the scheduling unit, and may also be a unit of resources actually allocated by a network device.

A two-level resource indication manner may achieve compatibility of resources with different subcarrier spacings, and is universal and simple.

In a possible implementation mode, the first indication information may be a first bit table. Each bit in the first bit table may correspond to each frequency-domain reference physical resource block in the scheduling unit, and first values of multiple continuous first bits in the first bit table may indicate that frequency-domain reference physical resource blocks corresponding to the first bits include the physical resource blocks of the first resource sub-band.

In a possible implementation mode, the first indication information may specifically be configured to indicate a position of the starting frequency-domain reference physical resource block in the frequency domain and a position of the ending frequency-domain reference physical resource block in the frequency domain, or the second indication information may specifically be configured to indicate the position of the starting frequency-domain reference physical resource block in the frequency domain and the number of the frequency-domain reference physical resource blocks including the first resource sub-band.

In a possible implementation mode, the second indication information may be a second bit table and a third bit table. Each bit in the second bit table and the third bit table may correspond to a physical resource block in the first resource sub-band. A second value of a bit in the second bit table may indicate that a physical resource block corresponding to the bit in the second bit table belongs to the starting frequency-domain reference physical resource block, and a third value of a bit in the third bit table may indicate that a physical resource block corresponding to the bit in the third bit table belongs to the ending frequency-domain reference physical resource block.

In a possible implementation mode, when the first resource sub-band and a second resource sub-band in the multiple resource sub-bands are located in non-overlapped frequency-domain reference physical resource blocks on the frequency domain, fourth values of multiple continuous second bits in the first bit table may indicate that frequency-domain reference physical resource blocks corresponding to the second bits include the physical resource blocks of the second resource sub-band on the frequency domain.

In a possible implementation mode, when the first resource sub-band and the second resource sub-band in the multiple resource sub-bands are located in overlapped frequency-domain reference physical resource blocks on the frequency domain, the resource configuration information may further include a fourth bit table. Each bit in the fourth bit table may correspond to each frequency-domain reference physical resource block in the scheduling unit, and fifth values of multiple continuous third bits in the fourth bit table may indicate that frequency-domain reference physical resource blocks corresponding to the third bits include the physical resource blocks of the second resource sub-band on the frequency domain.

In a possible implementation mode, the first position indication information may specifically be configured to indicate a starting physical resource block of the first resource sub-band in the frequency domain and the number of the physical resource blocks in the first resource sub-band, or the first position indication information may specifically be configured to indicate the starting physical resource block of the first resource sub-band in the frequency domain and an ending physical resource block of the first resource sub-band in the frequency domain.

In a possible implementation mode, indication of the starting physical resource block of the first resource sub-band in the frequency domain by the first position indication information may include the following. The first position indication information indicates a starting frequency-domain reference physical resource block and the position of the starting physical resource block in the starting frequency-domain reference physical resource block, and the starting frequency-domain reference physical resource block is a frequency-domain reference physical resource block including the starting physical resource block in the frequency domain. Indication of the ending physical resource block of the first resource sub-band in the frequency domain by the first position indication information may include the following. The first position indication information indicates an ending frequency-domain reference physical resource block and the position of the ending physical resource block in the ending frequency-domain reference physical resource block, and the ending frequency-domain reference physical resource block is a frequency-domain reference physical resource block including the ending physical resource block in the frequency domain. The subcarrier spacing of the frequency-domain reference physical resource block may be a multiple of the maximum subcarrier spacing preconfigured by the system.

A second aspect provides a data transmission method, which may include the following operations. Resource allocation information sent by a network device is received. The resource configuration information is configured to indicate multiple resource sub-bands for transmitting data in a scheduling unit, each of the multiple resource sub-bands is formed by continuous physical resource blocks on a frequency domain and at least two resource sub-bands in the multiple resource sub-bands have different subcarrier spacings. The data is communicated with the network device according to the resource allocation information.

The resource sub-bands with different subcarrier spacing for transmitting the data are indicated to a terminal device in the scheduling unit, so that localized continuous frequency-domain resources allocation with multiple attributes may be supported better.

In a possible implementation mode, the resource configuration information may include first position indication information, and the first position information may be configured to indicate a position of a first resource sub-band in the multiple resource sub-bands on the frequency domain. The operation that the data is communicated with the network device according to the resource allocation information may include the following action. Part of the data is communicated with the network device on the first resource sub-band according to the first position indication information.

In a possible implementation mode, the first position indication information may include first indication information and second indication information. The first indication information may be configured to indicate frequency-domain reference physical resource blocks including the first resource sub-band on the frequency domain in the scheduling unit, and a subcarrier spacing of each frequency-domain reference physical resource block may be a multiple of a maximum subcarrier spacing preconfigured by a system. The second indication information may be configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

In a possible implementation mode, the first indication information may be a first bit table. Each bit in the first bit table may correspond to each frequency-domain reference physical resource block in the scheduling unit, and first values of multiple continuous first bits in the first bit table may indicate that frequency-domain reference physical resource blocks corresponding to the first bits include the physical resource blocks of the first resource sub-band.

In a possible implementation mode, the first indication information may specifically be configured to indicate a position of the starting frequency-domain reference physical resource block in the frequency domain and a position of the ending frequency-domain reference physical resource block in the frequency domain, or the second indication information may specifically be configured to indicate the position of the starting frequency-domain reference physical resource block in the frequency domain and the number of the frequency-domain reference physical resource blocks including the first resource sub-band.

In a possible implementation mode, the second indication information may be a second bit table and a third bit table, each bit in the second bit table and the third bit table may correspond to a physical resource block in the first resource sub-band. A second value of a bit in the second bit table may indicate that a physical resource block corresponding to the bit in the second bit table belongs to the starting frequency-domain reference physical resource block, and a third value of a bit in the third bit table may indicate that a physical resource block corresponding to the bit in the third bit table belongs to the ending frequency-domain reference physical resource block.

In a possible implementation mode, when the first resource sub-band and a second resource sub-band in the multiple resource sub-bands are located in non-overlapped frequency-domain reference physical resource blocks on the frequency domain, fourth values of multiple continuous second bits in the first bit table may indicate that frequency-domain reference physical resource blocks corresponding to the second bits include the physical resource blocks of the second resource sub-band on the frequency domain.

In a possible implementation mode, when the first resource sub-band and the second resource sub-band in the multiple resource sub-bands are located in overlapped frequency-domain reference physical resource blocks on the frequency domain, the resource configuration information may further include a fourth bit table. Each bit in the fourth bit table may correspond to each frequency-domain reference physical resource block in the scheduling unit, and fifth values of multiple continuous third bits in the fourth bit table may indicate that frequency-domain reference physical resource blocks corresponding to the third bits include the physical resource blocks of the second resource sub-band on the frequency domain.

In a possible implementation mode, the first position indication information may specifically be configured to indicate a starting physical resource block of the first resource sub-band in the frequency domain and the number of the physical resource blocks in the first resource sub-band, or the first position indication information may specifically be configured to indicate the starting physical resource block of the first resource sub-band in the frequency domain and an ending physical resource block of the first resource sub-band in the frequency domain.

In a possible implementation mode, indication of the starting physical resource block of the first resource sub-band in the frequency domain by the first position indication information may include the following. The first position indication information indicates a starting frequency-domain reference physical resource block and the position of the starting physical resource block in the starting frequency-domain reference physical resource block, and the starting frequency-domain reference physical resource block is a frequency-domain reference physical resource block including the starting physical resource block in the frequency domain. Indication of the ending physical resource block of the first resource sub-band in the frequency domain by the first position indication information may include the following. The first position indication information indicates an ending frequency-domain reference physical resource block and the position of the ending physical resource block in the ending frequency-domain reference physical resource block, and the ending frequency-domain reference physical resource block is a frequency-domain reference physical resource block including the ending physical resource block on the frequency domain. The subcarrier spacing of the frequency-domain reference physical resource block may be a multiple of the maximum subcarrier spacing preconfigured by the system.

A third aspect provides a network device, which is configured to execute the method in the first aspect or any possible implementation mode of the first aspect. Specifically, the network device includes units configured to execute the method in the first aspect or any possible implementation mode of the first aspect.

A fourth aspect provides a terminal device, which is configured to execute the method in the second aspect or any possible implementation mode of the second aspect. Specifically, the terminal device includes units configured to execute the method in the second aspect or any possible implementation mode of the second aspect.

A fifth aspect provides a network device, which includes a memory, a processor and a transceiver. The memory, the processor and the transceiver mutually communicate through an internal connecting path to transmit control and/or data signals. The memory is configured to store an instruction. The processor is configured to execute the instruction stored in the memory. When the instruction is executed, the processor controls the transceiver to receive input data and information, and output data such as an operation result.

A sixth aspect provides a terminal device, which includes a memory, a processor and a transceiver. The memory, the processor and the transceiver mutually communicate through an internal connecting path to transmit control and/or data signals. The memory is configured to store an instruction. The processor is configured to execute the instruction stored in the memory. When the instruction is executed, the processor controls the transceiver to receive input data and information, and output data such as an operation result.

A seventh aspect provides a computer storage medium, which is configured to store computer software instructions for the above methods. The computer software instructions may include programs designed to execute the abovementioned aspects.

These aspects or other aspects of the disclosure will become apparent from the following descriptions of the embodiments.

BRIEF DESCRIPTION OF DRAWINGS

FIG. 5 is another schematic diagram of resource allocation according to an embodiment of the disclosure.

FIG. 6 is another schematic block diagram of a data transmission method according to an embodiment of the disclosure.

FIG. 7 is a schematic block diagram of a network device for data transmission according to an embodiment of the disclosure.

DETAILED DESCRIPTION

Figures 1, 2:
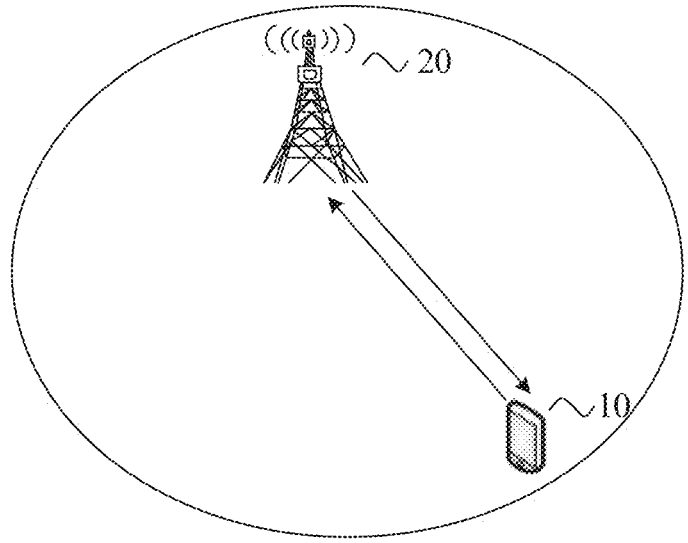
FIG. 1 is a schematic diagram of a possible application scenario according to an embodiment of the disclosure.
FIG. 2 is a schematic block diagram of a data transmission method according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may indicate User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Localized Loop (WLL) station, a Personal Digital Assistant (PDA), a handheld device with a wireless communication function, a computing device or another processing device connected to a wireless modem, a vehicle-mounted device, a wearable device, a terminal device in a future 5G network, a terminal device in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Alternatively, the network device may be a relay station, an access point, a vehicle-mounted device, a wearable device, a network device in the future 5G network, a network device in the future evolved PLMN or the like. There are no limits made in the embodiments of the disclosure.

FIG. 1 is a schematic diagram of an application scenario according to an embodiment of the disclosure. A communication system in FIG. 1 may include a terminal device 10 and a network device 20. The network device 20 is configured to provide communication service for the terminal device 10 and access a core network. The terminal device 10 searches a synchronization signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

Along with constant evolution of communication technologies, diversified service types are required in a future communication system, and a single subcarrier spacing in an LTE system may not meet a communication requirement. Unlike the LTE system, in a future wireless communication system such as 5G, multiple numerologies may coexist in a manner of Time Division Multiplexing (TDM), Frequency Division Multiplexing (FDM) or combination of the two in a carrier/cell/wireless Transmit Receive Point (TRP), to keep flexibility and forward compatibility of the system. Different numerologies usually adopt different carrier spacings, and resources with different subcarrier spacings may also be allocated for the same terminal in the same scheduling unit. However, an existing resource allocation method based on the same subcarrier spacing in the LTE system may not meet this requirement.

FIG. 2 is a schematic block diagram of a data transmission method 100 according to an embodiment of the disclosure. As illustrated in FIG. 2, the method 100 may be executed by a network device and, for example, may be executed by a base station. The method 100 includes the following operations.

In S110, resource configuration information is sent to a terminal device, the resource configuration information is configured to indicate multiple resource sub-bands for transmitting data in a scheduling unit, each of the multiple resource sub-bands is formed by continuous physical resource blocks in a frequency domain and at least two resource sub-bands in the multiple resource sub-bands have different subcarrier spacings.

In S120, the data is communicated with the terminal device on the multiple resource sub-bands.

Figure 3:
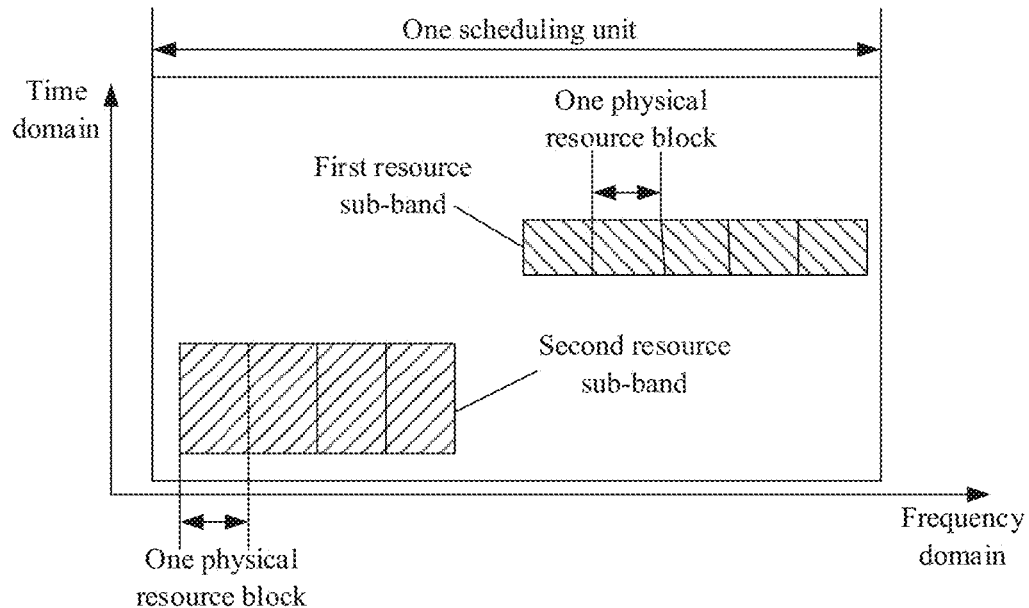
FIG. 3 is a schematic diagram of resource allocation according to an embodiment of the disclosure.

Specifically, the network device divides the whole scheduling unit into the multiple resource sub-bands according to multiple subcarrier spacings preconfigured by a system, each resource sub-band is formed by continuous physical resource blocks in the frequency domain, and at least two resource sub-bands adopt different subcarrier spacings, which specifically refers to FIG. 3. As illustrated in FIG. 3, assume that two resource sub-bands, i.e., a first resource sub-band and a second resource sub-band, are configured for the terminal device in a scheduling unit, the first resource sub-band may be formed by multiple continuous physical resource blocks illustrated in FIG. 3, and the second resource sub-band is also formed by multiple continuous physical resource blocks illustrated in FIG. 3. The physical resource blocks forming the first resource sub-band and the physical resource blocks forming the second resource sub-band have different frequency-domain widths. For example, the frequency-domain width of the physical resource blocks forming the first resource sub-band may be 45 kHz, and the frequency-domain width of the physical resource blocks forming the second resource sub-band may be 30 kHz.

It is to be understood that the scheduling unit may indicate one or more resource blocks with a certain width in the frequency domain, and is not limited in a time domain. The frequency-domain scheduling unit may occupy the whole system bandwidth and may also occupy part of the system bandwidth, and a minimum width of the frequency-domain scheduling unit is a basic physical resource block.

It is also to be understood that the data may indicate uplink data, namely the terminal device may send the data to the network device through the multiple resource sub-bands allocated by the network device, and may also indicate downlink data, namely the network device may also send the data to the terminal device through the multiple resource sub-bands allocated by the network device. There are no limits made thereto in the embodiment of the disclosure.

According to the data transmission method provided in the embodiment of the disclosure, the resource sub-bands with different subcarrier spacings are divided in the scheduling unit to perform transmission of the data, so that localized continuous frequency-domain resources allocation with multiple attributes may be supported better.

In at least one embodiment of the disclosure, the resource configuration information includes first position indication information, and the first position indication information is configured to indicate a position of a first resource sub-band in the multiple resource sub-bands on the frequency domain.

Those skilled in the art knows that resource scheduling is required by transmission of the uplink data and transmission of the downlink data, that is, the network device is required to notify a system resource allocation process to the terminal device and then the terminal device may know about time and resources for data transmission or data reception. In a 5G system, the same terminal device is likely to send or receive data on resources with different subcarrier spacings, i.e., the resource sub-bands mentioned in the embodiment of the disclosure, in the scheduling unit, so that the resource configuration information sent to the terminal device by the network device includes a position of each resource sub-band on the frequency domain in the scheduling unit. For example, the resource configuration information sent to the terminal device by the network device includes two position indication information. The two position indication information indicate the positions of the first resource sub-band and second resource sub-band illustrated in FIG. 3 respectively, and may specifically indicate positions of multiple continuous physical resource blocks in the first resource sub-band on the frequency domain and positions of multiple continuous physical resource blocks in the second resource sub-band on the frequency domain.

In at least one embodiment of the disclosure, the first position indication information includes first indication information and second indication information. The first indication information is configured to indicate frequency-domain reference physical resource blocks including the first resource sub-band on the frequency domain in the scheduling unit, and a subcarrier spacing of each frequency-domain reference physical resource block is a multiple of a maximum subcarrier spacing preconfigured by a system. The second indication information is specifically configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

Figure 4:
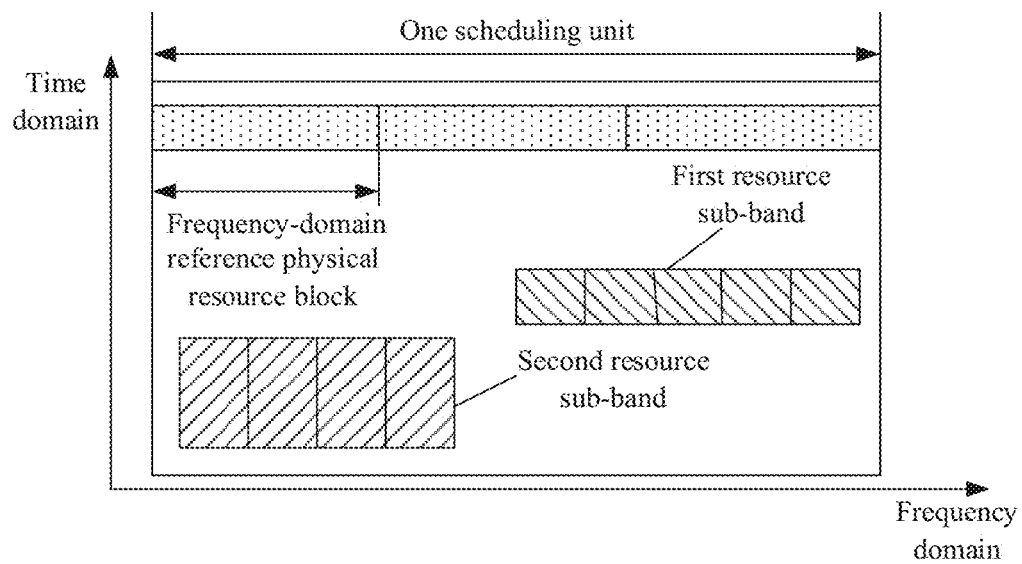
FIG. 4 is another schematic diagram of resource allocation according to an embodiment of the disclosure.

It is to be understood that the frequency-domain reference physical resource block may be a unit for virtually dividing the scheduling unit, and may also be a unit of resources actually allocated by a network device. For example, the network device, before sending the resource configuration information to the terminal device, may further notify frequency-domain widths of the frequency-domain reference physical resource blocks to the terminal device in a broadcast manner. The network device may allocate a resource block on the whole frequency domain of the scheduling unit, and the resource block is formed by multiple frequency-domain reference physical resource blocks. As illustrated in FIG. 4, the network device configures a resource block in a scheduling unit, the resource block is formed by three frequency-domain reference physical resource blocks, and a frequency-domain width of each frequency-domain reference physical resource block may be a maximum subcarrier spacing preconfigured by the whole system. For example, when subcarrier spacings preconfigured in the system include 15 kHz, 30 kHz, 60 kHz and 120 kHz, the network device may configure a resource block formed by multiple frequency-domain reference physical resource blocks, and a frequency-domain width of each frequency-domain reference physical resource block may be 120 kHz. The network device may also not actually divide the resource block formed by the frequency-domain reference physical resource blocks but directly divides the scheduling unit by a frequency-domain reference physical resource block. For example, a frequency-domain width of the virtual frequency-domain reference physical resource block may be 240 kHz.

It is to be understood that in the embodiment of the disclosure, the multiple resource sub-bands may include resources formed by all subcarrier spacings preconfigured in the system, and may also only include resources formed by part of the preconfigured subcarrier spacings. As described above, the network device may directly configure resource sub-bands formed by 15 kHz, 30 kHz, 60 kHz and 120 kHz for the terminal device, and may also only configure the resource sub-bands formed by 15 kHz and 30 kHz according to a requirement of the terminal device. The frequency-domain width of the frequency-domain reference physical resource block may be a multiple of the maximum subcarrier spacing in the system, and may also be more than or equal to the maximum subcarrier spacing adopted in the configured resource sub-bands. There are no limits made thereto in the disclosure.

A two-level resource indication manner may be adopted to determine the positions of the resource sub-bands in the frequency domain.

A resource indication of the first level may roughly indicate a configuration of the resource sub-bands in the frequency domain by use of the frequency-domain reference physical resource blocks. In at least one embodiment, a bit table is used, and a length of the bit table may be the total number of frequency-domain reference physical resource blocks in the present scheduling unit. Each bit in the bit table corresponds to a frequency-domain reference physical resource block. Specifically, a value 1 of each bit may indicate that the frequency-domain reference physical resource block includes resources of a certain resource sub-band, and otherwise, it does not include the resources. Assume that a scheduling unit includes four frequency-domain reference physical resource blocks. A bit table for indicating frequency-domain reference physical resource blocks including the first resource sub-band is 0111, it is indicated that a second frequency-domain reference physical resource block to fourth frequency-domain reference physical resource block in the whole scheduling unit include the resources of the first resource sub-band on the frequency domain. In another embodiment, a position of a frequency-domain reference physical resource block including a starting physical resource block of a certain resource sub-band in the frequency domain and a position of a frequency-domain reference physical resource block including an ending physical resource block of the resource sub-band in the frequency domain may also be indicated, or the position of the frequency-domain reference physical resource block including the starting physical resource block of a certain resource sub-band in the frequency domain and the number of all frequency-domain reference physical resource blocks including physical resource blocks of the resource sub-band may also be indicated. In other words, a pointer of a starting frequency-domain reference physical resource block including a certain resource sub-band and a pointer of an ending frequency-domain reference physical resource block including the resource sub-band may be included, or the pointer of the starting frequency-domain reference physical resource block including a certain resource sub-band and the number of frequency-domain reference physical resource blocks including the resource sub-band may be included. It is to be understood that, if a resource sub-band exists in only one frequency-domain reference physical resource block, a pointer of the frequency-domain reference physical resource block may be simply used for the indication of the first level.

A resource indication of the second level may further indicate the position of the resource sub-band on the frequency domain by use of the positions of the physical resource blocks of the resource sub-band in the corresponding frequency-domain reference physical resource blocks. Specifically, a position of a starting physical resource block allocated for a certain resource sub-band in a starting frequency-domain reference physical resource block and a position of an ending physical resource block allocated for the resource sub-band in an ending frequency-domain reference physical resource block are included. For example, if a frequency-domain reference physical resource block includes eight physical resource blocks of a certain resource sub-band, a position of a starting physical resource block in the starting frequency-domain reference physical resource block may be any of positions 1-8, and namely may be represented by three bits. Similarly, a position of an ending physical resource block in the ending frequency-domain reference physical resource block may also be represented by three bits.

In at least one embodiment, the positions of the physical resource blocks of a certain resource sub-band in the starting frequency-domain reference physical resource block and the positions of the physical resource blocks of the resource sub-band in the ending frequency-domain reference physical resource block may also be represented by two small bit tables respectively. Specifically, a length of each bit table is the number of the physical resource blocks of a certain resource sub-band in a frequency-domain reference physical resource block. A bit having a value 1 indicates that the physical resource block corresponding to the bit belongs to the resource sub-band.

It is to be understood that the values of the bit tables and the two-level resource indication manner are only exemplarily described for convenient understanding and not intended to limit the embodiment of the disclosure.

In at least one embodiment of the disclosure, when resource sub-bands are located in non-overlapped frequency-domain reference physical resource blocks, the resource indication of the first level may adopt a bit table to represent all the resource sub-bands. When the resource sub-bands are located in overlapped frequency-domain reference physical resource blocks, the resource indication of the first level may use separate bit tables to represent different resource sub-bands.

The two-level resource indication manner may achieve compatibility of resources with different subcarrier spacings, and is universal and simple.

The total number of bits used by the two-level resource indication manner may be summarized as follows. If there are N frequency-domain reference resource blocks (corresponding to a frequency-domain reference subcarrier spacing f) in the system bandwidth, a resource configuration for the present terminal device includes K resource sub-bands corresponding to subcarrier spacings $f_1, f_2, \ldots f_k$ respectively, the numbers of physical resource blocks corresponding to each resource sub-band in each frequency-domain reference resource block are $M_1, M_2, \ldots M_k$ respectively, a bit table used for the first level requires N bits and the total number of bits required by determination of starting and ending positions of each resource sub-band in the second level is $\Sigma_i^K 2 \log_2(M_i)$. Therefore, the total number of required bits is $N+\Sigma_i^K 2 \log_2(M_i)$.

In at least one embodiment of the disclosure, the position of the starting physical resource block in each resource sub-band on the frequency domain and the number of the physical resource blocks in each resource sub-band may also be directly indicated, or the position of the starting physical resource block in a certain resource sub-band on the frequency domain and the position of the corresponding ending physical resource block may also be indicated, such that the positions of the resource sub-bands in the frequency domain may be indicated.

Furthermore, a starting position of physical resource blocks of a certain resource sub-band may be determined by a position of a frequency-domain reference physical resource block including a starting physical resource block and a relative position of the starting physical resource block of the resource sub-band in the frequency-domain reference physical resource block. Similarly, an ending position of physical resource blocks of a certain resource sub-band may be determined by a position of a frequency-domain reference physical resource block including an ending physical resource block and a relative position of the ending physical resource block of the resource sub-band in the frequency-domain reference physical resource block.

Specifically, as illustrated in FIG. 5, the frequency domain is still divided by the frequency-domain reference physical resource block firstly, and then a starting position of a resource sub-band is determined. As illustrated in FIG. 5, physical resources allocated in the resource sub-band are started from the frequency domain corresponding to a kth frequency-domain reference physical resource block (assume that a starting pointer of the frequency-domain reference physical resource block is 0), and a starting offset in the kth frequency-domain reference physical resource block is n. If the frequency-domain reference physical resource block includes four physical resource blocks corresponding to the resource sub-band, an absolute pointer of the starting physical resource block is 4k+n, and an allocated resource length 5 is the number of the physical resource blocks.

The total number of bits used by a direct indication manner is summarized as follows. If there are N frequency-domain reference resource blocks corresponding to the frequency-domain reference subcarrier spacing f) in the system bandwidth, a resource configuration for the present terminal device includes K resource sub-bands corresponding to subcarrier spacings $f_1, f_2, \ldots f_k$ respectively, and the numbers of physical resource blocks corresponding to each resource sub-band in each frequency-domain reference resource block are $M_1, M_2, \ldots M_k$ respectively. Therefore, the total number of required bits is $2K^* \log_2(N)+\Sigma_i^K 2 \log_2(M_i)$.

Comparison of the numbers of the bits required in the two-level resource indication manner and in the direct indication manner may indicate that the difference lies in the first term. When N is relatively large and K is relatively small, the number of the bits required in the direct indication manner may be less than that required in the two-level resource indication manner. Otherwise, the number of the bits required in the two-level resource indication manner may be less than that required in the direct indication manner. For example, the whole system bandwidth is 80 MHz, when subcarrier spacings of frequency-domain reference resource blocks are set to be 60 kHz, there are 128 frequency-domain reference resource blocks on the frequency domain. If four resource sub-bands are allocated, resources of the first term required in the two-level resource indication manner are N=128>2*4*log(128) (resources of the first term required in the direct indication manner). However, if a width of a frequency-domain reference physical resource block on the frequency domain is 16*180 kHz=2,880 kHz, the whole 80 MHz bandwidth may include 32 frequency-domain reference physical resource blocks, and in such case, the resources of the first term required in the two-level resource indication manner are N=32<2*4*log (32) (the resources of the first term required in the direct indication manner). In general, for the two-level resource indication manner, when the number of the reference physical resource blocks is relatively small, fewer bits may be used for simultaneous allocation of multiple resource sub-bands with different carrier spacings to the same terminal; and for the direct indication manner, when the number of the reference physical resource blocks is relatively great, fewer bits may be used for allocation of multiple resource blocks with different carrier spacings to the same terminal.

In at least one embodiment, the resource configuration information may further include information for indicating the number of the resource sub-bands in resources presently allocated for the terminal device. For example, 3 bits may be used to indicate at most 8 resource sub-bands. It is to be understood that the resource sub-band in the embodiments of the disclosure may be formed by continuous physical resource blocks and may also be formed by multiple discontinuous physical resource blocks with the same subcarrier spacing. There are no limits made thereto in the embodiment of the disclosure.

It is to be understood that the technical solution of the embodiment of the disclosure is also applied to allocation of Virtual Resource Blocks (VRBs). The only difference is that the VRBs are mapped onto physical resource blocks according to some preset mappings after the VRBs are allocated according to the abovementioned method. In such a mapping manner, discrete resource allocation may also be implemented.

FIG. 6 is a schematic block diagram of a data transmission method 200 according to an embodiment of the disclosure. As illustrated in FIG. 6, the method 200 may be executed by a terminal device and, for example, may be executed by UE. The method 200 includes the following operations.

In S210, resource allocation information sent by a network device is received, the resource configuration information is configured to indicate multiple resource sub-bands for transmitting data in a scheduling unit, each of the multiple resource sub-bands is formed by continuous physical resource blocks in a frequency domain and at least two resource sub-bands in the multiple resource sub-bands have different subcarrier spacings.

In S220, the data is communicated with the network device according to the resource allocation information.

According to the data transmission method provided in the embodiment of the disclosure, the resource sub-bands with different subcarrier spacings for transmitting the data are indicated to the terminal device in the scheduling unit, so that localized continuous frequency-domain resources allocation with multiple attributes may be supported better.

In at least one embodiment of the disclosure, the resource configuration information includes first position indication information, and the first position information is configured to indicate a position of a first resource sub-band of the multiple resource sub-bands on the frequency domain. The operation that the data is communicated with the network device according to the resource allocation information includes the following action. Part of the data is communicated with the network device on the first resource sub-band according to the first position indication in formation.

In at least one embodiment of the disclosure, the first position information includes first indication information and second indication information. The first indication information is configured to indicate frequency-domain reference physical resource blocks including the first resource sub-band on the frequency domain in the scheduling unit, and a subcarrier spacing of each frequency-domain reference physical resource block is a multiple of a maximum subcarrier spacing preconfigured by a system. The second indication information is configured to indicate positions of physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

In at least one embodiment of the disclosure, the first indication information is a first bit table, and each bit in the first bit table corresponds to each frequency-domain reference physical resource block in the scheduling unit. First values of multiple continuous first bits in the first bit table indicate that the frequency-domain reference physical resource blocks corresponding to the first bits include the physical resource blocks of the first resource sub-band.

In at least one embodiment of the disclosure, the first indication information is specifically configured to indicate a position of the starting frequency-domain reference physical resource block on the frequency domain and a position of the ending frequency-domain reference physical resource block on the frequency domain, or the first indication information is specifically configured to indicate the position of the starting frequency-domain reference physical resource block on the frequency domain and the number of the frequency-domain reference physical resource blocks including the first resource sub-band.

In at least one embodiment of the disclosure, the second indication information is a second bit table and a third bit table, and each bit in the second bit table and the third bit table corresponds to a physical resource block in the first resource sub-band. A second value of a bit in the second bit table indicates that the physical resource block corresponding to the bit in the second bit table belongs to the starting frequency-domain reference physical resource block, and a third value of a bit in the third bit table indicates that the physical resource block corresponding to the bit in the third bit table belongs to the ending frequency-domain reference physical resource block.

In at least one embodiment of the disclosure, when the first resource sub-band and a second resource sub-band in the multiple resource sub-bands are located in non-overlapped frequency-domain reference physical resource blocks on the frequency domain, fourth values of multiple continuous second bits in the first bit table indicate that the frequency-domain reference physical resource blocks corresponding to the second bits include the physical resource blocks of the second resource sub-band on the frequency domain.

In at least one embodiment of the disclosure, when the first resource sub-band and the second resource sub-band in the multiple resource sub-bands are located in overlapped frequency-domain reference physical resource blocks on the frequency domain, the resource configuration information further includes a fourth bit table. Each bit in the fourth bit table corresponds to each frequency-domain reference physical resource block in the scheduling unit, and fifth values of multiple continuous third bits in the fourth bit table indicate that the frequency-domain reference physical resource blocks corresponding to the third bits include the physical resource blocks of the second resource sub-band on the frequency domain.

In at least one embodiment of the disclosure, the first position indication information is specifically configured to indicate a starting physical resource block of the first resource sub-band on the frequency domain and the number of the physical resource blocks in the first resource sub-band, or the first position indication information is specifically configured to indicate the starting physical resource block of the first resource sub-band on the frequency domain and an ending physical resource block of the first resource sub-band on the frequency domain.

In at least one embodiment of the disclosure, indication of the starting physical resource block of the first resource sub-band on the frequency domain by the first position indication information includes the following. The first position indication information indicates a starting frequency-domain reference physical resource block and the position of the starting physical resource block in the starting frequency-domain reference physical resource block. The starting frequency-domain reference physical resource block is a frequency-domain reference physical resource block including the starting physical resource block on the frequency domain. Indication of the ending physical resource block of the first resource sub-band on the frequency domain by the first position indication information includes the following. The first position indication information indicates an ending frequency-domain reference physical resource block and the position of the ending physical resource block in the ending frequency-domain reference physical resource block. The ending frequency-domain reference physical resource block is a frequency-domain reference physical resource block including the ending physical resource block on the frequency domain. The subcarrier spacing of the frequency-domain reference physical resource block is a multiple of the maximum subcarrier spacing preconfigured by the system.

It is to be understood that interaction between the terminal device and the network device, related properties, functions and the like described from a terminal device side correspond to related properties and functions described from a network device side and will not be elaborated herein for brief description.

It is also to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

The data transmission method according to the embodiments of the disclosure is described above in detail and a device for data transmission according to the embodiments of the disclosure will be described below in combination with FIG. 7 to FIG. 10. The technical characteristics described in the method embodiments are applied to the following device embodiments.

FIG. 7 is a schematic block diagram of a network device 300 for data transmission according to an embodiment of the disclosure. As illustrated in FIG. 7, the network device 300 includes a sending unit 310 and a transmission unit 320.

The sending unit 310 is configured to send resource configuration information to a terminal device. The resource configuration information is configured to indicate multiple resource sub-bands for transmitting data in a scheduling unit, each of the multiple resource sub-bands is formed by continuous physical resource blocks in a frequency domain and at least two resource sub-bands in the multiple resource sub-bands have different subcarrier spacings.

The transmission unit 320 is configured to communicate the data with the terminal device on the multiple resource sub-bands.

According to the network device for data transmission provided in the embodiment of the disclosure, the resource sub-bands with different subcarrier spacings are divided in the scheduling unit to perform transmission of the data, so that localized continuous frequency-domain resources allocation with multiple attributes may be supported better.

In at least one embodiment of the disclosure, the resource configuration information includes first position indication information. The first position indication information is configured to indicate a position of a first resource sub-band in the multiple resource sub-bands on the frequency domain.

In at least one embodiment of the disclosure, the first position indication information includes first indication information and second indication information. The first indication information is configured to indicate frequency-domain reference physical resource blocks including the first resource sub-band on the frequency domain in the scheduling unit, and a subcarrier spacing of each frequency-domain reference physical resource block is a multiple of a maximum subcarrier spacing preconfigured by a system. The second indication information is configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

In at least one embodiment of the disclosure, the first indication information is a first bit table, and each bit in the first bit table corresponds to each frequency-domain reference physical resource block in the scheduling unit. First values of multiple continuous first bits in the first bit table indicate that the corresponding frequency-domain reference physical resource blocks include the physical resource blocks of the first resource sub-band.

In at least one embodiment of the disclosure, the first indication information is specifically configured to indicate a position of the starting frequency-domain reference physical resource block on the frequency domain and a position of the ending frequency-domain reference physical resource block on the frequency domain, or the second indication information is specifically configured to indicate the position of the starting frequency-domain reference physical resource block on the frequency domain and the number of the frequency-domain reference physical resource blocks including the first resource sub-band.

In at least one embodiment of the disclosure, the second indication information is a second bit table and a third bit table. Each bit in the second bit table and the third bit table corresponds to a physical resource block in the first resource sub-band. A second value of a bit in the second bit table indicates that the corresponding physical resource block belongs to the starting frequency-domain reference physical resource block, and a third value of a bit in the third bit table indicates that the corresponding physical resource block belongs to the ending frequency-domain reference physical resource block.

In at least one embodiment of the disclosure, when the first resource sub-band and a second resource sub-band in the multiple resource sub-bands are located in non-overlapped frequency-domain reference physical resource blocks on the frequency domain, fourth values of multiple continuous second bits in the first bit table indicate that the corresponding frequency-domain reference physical resource blocks include the physical resource blocks of the second resource sub-band on the frequency domain.

In at least one embodiment of the disclosure, when the first resource sub-band and the second resource sub-band in the multiple resource sub-bands are located in overlapped frequency-domain reference physical resource blocks on the frequency domain, the resource configuration information further includes a fourth bit table. Each bit in the fourth bit table corresponds to each frequency-domain reference physical resource block in the scheduling unit, and fifth values of multiple continuous third bits in the fourth bit table indicate that the corresponding frequency-domain reference physical resource blocks include the physical resource blocks of the second resource sub-band on the frequency domain.

In at least one embodiment of the disclosure, the first position indication information is specifically configured to indicate a starting physical resource block of the first resource sub-band on the frequency domain and the number of the physical resource blocks in the first resource sub-band, or the first position indication information is specifically configured to indicate the starting physical resource block of the first resource sub-band on the frequency domain and an ending physical resource block of the first resource sub-band on the frequency domain.

In at least one embodiment of the disclosure, indication of the starting physical resource block of the first resource sub-band on the frequency domain by the first position indication information includes the following. The first position indication information indicates a starting frequency-domain reference physical resource block and the position of the starting physical resource block in the starting frequency-domain reference physical resource block. The starting frequency-domain reference physical resource block is a frequency-domain reference physical resource block including the starting physical resource block on the frequency domain. Indication of the ending physical resource block of the first resource sub-band on the frequency domain by the first position indication information includes the following. The first position indication information indicates an ending frequency-domain reference physical resource block and the position of the ending physical resource block in the ending frequency-domain reference physical resource block. The ending frequency-domain reference physical resource block is a frequency-domain reference physical resource block including the ending physical resource block on the frequency domain. The subcarrier spacing of the frequency-domain reference physical resource block is a multiple of the maximum subcarrier spacing preconfigured by the system.

It is to be understood that the network device 300 for data transmission according to the embodiment of the disclosure may correspond to the network device in the method embodiments of the disclosure. The abovementioned and other operations and/or functions of each unit in the network device 300 are adopted to implement the corresponding flows of the methods in FIG. 2 to FIG. 5 respectively and will not be elaborated herein for brief description.

Figure 8:
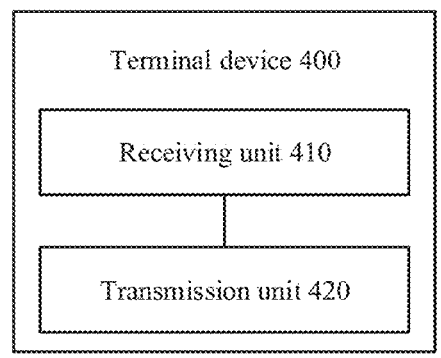
FIG. 8 is a schematic block diagram of a terminal device for data transmission according to an embodiment of the disclosure.

FIG. 8 illustrates a terminal device 400 for data transmission according to an embodiment of the disclosure. As illustrated in FIG. 8, the terminal device 400 includes a receiving unit 410 and a transmission unit 420.

The receiving unit 410 is configured to receive resource allocation information sent by a network device. The resource configuration information is configured to indicate multiple resource sub-bands for transmitting data in a scheduling unit, each of the multiple resource sub-bands is formed by continuous physical resource blocks on a frequency domain and at least two resource sub-bands in the multiple resource sub-bands have different subcarrier spacings.

The transmission unit 420 is configured to communicate the data with the network device according to the resource allocation information.

According to the terminal device for data transmission provided in the embodiment of the disclosure, the resource sub-bands with different subcarrier spacings for performing transmission of the data are indicated to the terminal device in the scheduling unit, so that localized continuous frequency-domain resources allocation with multiple attributes may be supported better.

In at least one embodiment of the disclosure, the resource configuration information includes first position indication information, and the first position information is configured to indicate a position of a first resource sub-band in the multiple resource sub-bands on the frequency domain. The transmission unit 420 is specifically configured to communicate part of the data with the network device on the first resource sub-band according to the first position indication information.

In at least one embodiment of the disclosure, the first position indication information includes first indication information and second indication information. The first indication information is configured to indicate frequency-domain reference physical resource blocks including the first resource sub-band on the frequency domain in the scheduling unit, and a subcarrier spacing of each frequency-domain reference physical resource block is a multiple of a maximum subcarrier spacing preconfigured by a system. The second indication information is configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

In at least one embodiment of the disclosure, the first indication information is a first bit table. Each bit in the first bit table corresponds to each frequency-domain reference physical resource block in the scheduling unit, and first values of multiple continuous first bits in the first bit table indicate that the corresponding frequency-domain reference physical resource blocks include the physical resource blocks of the first resource sub-band.

In at least one embodiment of the disclosure, the first indication information is specifically configured to indicate a position of the starting frequency-domain reference physical resource block on the frequency domain and a position of the ending frequency-domain reference physical resource block on the frequency domain, or the first indication information is specifically configured to indicate the position of the starting frequency-domain reference physical resource block on the frequency domain and the number of the frequency-domain reference physical resource blocks including the first resource sub-band.

In at least one embodiment of the disclosure, the second indication information is a second bit table and a third bit table. Each bit in the second bit table and the third bit table corresponds to a physical resource block in the first resource sub-band. A second value of a bit in the second bit table indicates that the corresponding physical resource block belongs to the starting frequency-domain reference physical resource block, and a third value of a bit in the third bit table indicates that the corresponding physical resource block belongs to the ending frequency-domain reference physical resource block.

In at least one embodiment of the disclosure, when the first resource sub-band and a second resource sub-band in the multiple resource sub-bands are located in non-overlapped frequency-domain reference physical resource blocks on the frequency domain, fourth values of multiple continuous second bits in the first bit table indicate that the corresponding frequency-domain reference physical resource blocks include the physical resource blocks of the second resource sub-band on the frequency domain.

In at least one embodiment of the disclosure, when the first resource sub-band and the second resource sub-band in the multiple resource sub-bands are located in overlapped frequency-domain reference physical resource blocks on the frequency domain, the resource configuration information further includes a fourth bit table. Each bit in the fourth bit table corresponds to each frequency-domain reference physical resource block in the scheduling unit, and fifth values of multiple continuous third bits in the fourth bit table indicate that the corresponding frequency-domain reference physical resource blocks include the physical resource blocks of the second resource sub-band on the frequency domain.

In at least one embodiment of the disclosure, the first position indication information is specifically configured to indicate a starting physical resource block of the first resource sub-band on the frequency domain and the number of the physical resource blocks in the first resource sub-band, or the first position indication information is specifically configured to indicate the starting physical resource block of the first resource sub-band on the frequency domain and an ending physical resource block of the first resource sub-band on the frequency domain.

In at least one embodiment of the disclosure, indication of the starting physical resource block of the first resource sub-band on the frequency domain by the first position indication information includes the following. The first position indication information indicates a starting frequency-domain reference physical resource block and the position of the starting physical resource block in the starting frequency-domain reference physical resource block. The starting frequency-domain reference physical resource block is a frequency-domain reference physical resource block including the starting physical resource block on the frequency domain. Indication of the ending physical resource block of the first resource sub-band on the frequency domain by the first position indication information includes the following. The first position indication information indicates an ending frequency-domain reference physical resource block and the position of the ending physical resource block in the ending frequency-domain reference physical resource block. The ending frequency-domain reference physical resource block is a frequency-domain reference physical resource block including the ending physical resource block on the frequency domain. The subcarrier spacing of the frequency-domain reference physical resource block is a multiple of the maximum subcarrier spacing preconfigured by the system.

It is to be understood that the terminal device 400 for data transmission according to the embodiment of the disclosure may correspond to the terminal device in the method embodiments of the disclosure. The abovementioned and other operations and/or functions of each unit in the terminal device 400 are adopted to implement the corresponding flows of the method in FIG. 6 respectively and will not be elaborated herein for brief description.

Figure 9:
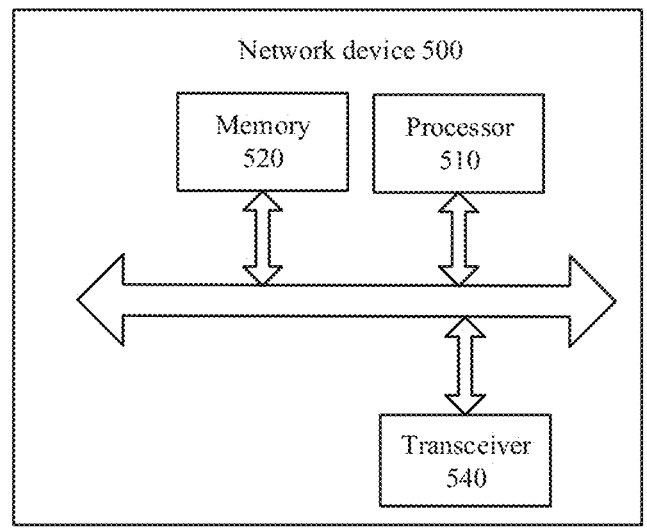
FIG. 9 is another schematic block diagram of a network device for data transmission according to an embodiment of the disclosure.

As illustrated in FIG. 9, the disclosure also provides a network device 500 for data transmission, which includes a processor 510, a memory 520 and a transceiver 540. The processor 510, the memory 520 and the transceiver 540 communicate with one another through an internal connecting path to transmit control and/or data signals. The memory 520 is configured to store an instruction. The processor 510 is configured to execute the instruction stored in the memory 520 to control the transceiver 540 to send a signal. The processor 510 is configured to send resource configuration information to a network device, the resource configuration information being configured to indicate multiple resource sub-bands for transmitting data in a scheduling unit, each of the multiple resource sub-bands being formed by continuous physical resource blocks on a frequency domain and at least two resource sub-bands in the multiple resource sub-bands having different subcarrier spacings, and communicate the data with the network device on the multiple resource sub-bands.

According to the network device for data transmission provided in the embodiment of the disclosure, the resource sub-bands with different subcarrier spacings are divided in the scheduling unit to perform transmission of the data, so that localized continuous frequency-domain resources allocation with multiple attributes may be supported better.

It is to be understood that, in the embodiment of the disclosure, the processor 510 may be a Central Processing Unit (CPU) and the processor 510 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 520 may include a Read-Only Memory (ROM) and a Random Access Memory (RAM) and provides an instruction and data to the processor 510. A part of the memory 520 may further include a nonvolatile RAM. For example, the memory 520 may further store information of a device type.

In an implementation process, each operation of the method may be completed by an integrated logic circuit of hardware in the processor 510 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 520. The processor 510 reads information in the memory 520 and completes the operations of the method in combination with hardware. No more detailed descriptions will be made herein to avoid repetitions.

In at least one embodiment of the disclosure, the resource configuration information includes first position indication information, and the first position indication information is configured to indicate a position of a first resource sub-band in the multiple resource sub-bands on the frequency domain.

In at least one embodiment of the disclosure, the first position indication information includes first indication information and second indication information. The first indication information is configured to indicate frequency-domain reference physical resource blocks including the first resource sub-band on the frequency domain in the scheduling unit, and a subcarrier spacing of each frequency-domain reference physical resource block is a multiple of a maximum subcarrier spacing preconfigured by a system. The second indication information is specifically configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

In at least one embodiment of the disclosure, the first indication information is a first bit table. Each bit in the first bit table corresponds to each frequency-domain reference physical resource block in the scheduling unit, and first values of multiple continuous first bits in the first bit table indicate that the corresponding frequency-domain reference physical resource blocks include the physical resource blocks of the first resource sub-band.

In at least one embodiment of the disclosure, the first indication information is specifically configured to indicate a position of the starting frequency-domain reference physical resource block on the frequency domain and a position of the ending frequency-domain reference physical resource block on the frequency domain, or the second indication information is specifically configured to indicate the position of the starting frequency-domain reference physical resource block on the frequency domain and the number of the frequency-domain reference physical resource blocks including the first resource sub-band.

In at least one embodiment of the disclosure, the second indication information is a second bit table and a third bit table. Each bit in the second bit table and the third bit table corresponds to a physical resource block in the first resource sub-band. A second value of a bit in the second bit table indicates that the corresponding physical resource block belongs to the starting frequency-domain reference physical resource block, and a third value of a bit in the third bit table indicates that the corresponding physical resource block belongs to the ending frequency-domain reference physical resource block.

In at least one embodiment of the disclosure, when the first resource sub-band and a second resource sub-band in the multiple resource sub-bands are located in non-overlapped frequency-domain reference physical resource blocks on the frequency domain, fourth values of multiple continuous second bits in the first bit table indicate that the corresponding frequency-domain reference physical resource blocks include the physical resource blocks of the second resource sub-band on the frequency domain.

In at least one embodiment of the disclosure, when the first resource sub-band and the second resource sub-band in the multiple resource sub-bands are located in overlapped frequency-domain reference physical resource blocks on the frequency domain, the resource configuration information further includes a fourth bit table. Each bit in the fourth bit table corresponds to each frequency-domain reference physical resource block in the scheduling unit, and fifth values of multiple continuous third bits in the fourth bit table indicate that the corresponding frequency-domain reference physical resource blocks include the physical resource blocks of the second resource sub-band on the frequency domain.

In at least one embodiment of the disclosure, the first position indication information is specifically configured to indicate a starting physical resource block of the first resource sub-band on the frequency domain and the number of the physical resource blocks in the first resource sub-band, or the first position indication information is specifically configured to indicate the starting physical resource block of the first resource sub-band on the frequency domain and an ending physical resource block of the first resource sub-band on the frequency domain.

In at least one embodiment of the disclosure, indication of the starting physical resource block of the first resource sub-band on the frequency domain by the first position indication information includes the following. The first position indication information indicates a starting frequency-domain reference physical resource block and the position of the starting physical resource block in the starting frequency-domain reference physical resource block, and the starting frequency-domain reference physical resource block is a frequency-domain reference physical resource block including the starting physical resource block on the frequency domain. Indication of the ending physical resource block of the first resource sub-band on the frequency domain by the first position indication information includes the following. The first position indication information indicates an ending frequency-domain reference physical resource block and the position of the ending physical resource block in the ending frequency-domain reference physical resource block, and the ending frequency-domain reference physical resource block is a frequency-domain reference physical resource block including the ending physical resource block on the frequency domain. The subcarrier spacing of the frequency-domain reference physical resource block is a multiple of the maximum subcarrier spacing preconfigured by the system.

It is to be understood that the network device 500 for data transmission according to the embodiment of the disclosure may correspond to the network device and network device 300 in the embodiments of the disclosure and may correspond to the network device executing the methods according to the embodiments of the disclosure. The abovementioned and other operations and/or functions of each unit in the network device 500 are adopted to implement the corresponding flows of each method in FIG. 2 to FIG. 5 respectively and will not be elaborated herein for brief description.

Figure 10:
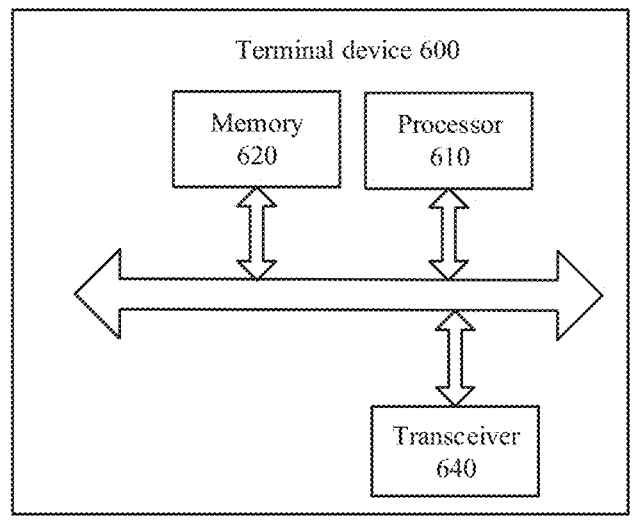
FIG. 10 is another schematic block diagram of a terminal device for data transmission according to an embodiment of the disclosure.

As illustrated in FIG. 10, an embodiment of the disclosure also provides a terminal device 600 for data transmission, which includes a processor 610, a memory 620 and a transceiver 640. The processor 610, the memory 620 and the transceiver 640 communicate with one another through an internal connecting path to transmit control and/or data signals. The memory 620 is configured to store an instruction. The processor 650 is configured to execute the instruction stored in the memory 620 to control the transceiver 640 to send a signal. The processor 610 is configured to receive resource allocation information sent by a network device, the resource configuration information being configured to indicate multiple resource sub-bands for transmitting data in a scheduling unit, each of the multiple resource sub-bands being formed by continuous physical resource blocks on a frequency domain and at least two resource sub-bands in the multiple resource sub-bands having different subcarrier spacings, and communicate the data with the network device according to the resource allocation information.

According to the terminal device for data transmission provided in the embodiment of the disclosure, the resource sub-bands with different subcarrier spacings for transmitting the data are indicated to the terminal device in the scheduling unit, so that localized continuous frequency-domain resources allocation with multiple attributes may be supported better.

It is to be understood that, in the embodiment of the disclosure, the processor 610 may be a CPU and the processor 610 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 620 may include a ROM and a RAM and provides an instruction and data to the processor 610. A part of the memory 620 may further include a nonvolatile RAM. For example, the memory 620 may further store information of a device type.

In an implementation process, each operation of the method may be completed by an integrated logic circuit of hardware in the processor 610 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 620. The processor 610 reads information in the memory 620 and completes the operations of the method in combination with hardware. No more detailed descriptions will be made herein to avoid repetitions.

In at least one embodiment of the disclosure, the resource configuration information includes first position indication information, and the first position information is configured to indicate a position of a first resource sub-band in the multiple resource sub-bands on the frequency domain. The processor 610 is specifically configured to communicate part of the data with the network device on the first resource sub-band according to the first position indication information.

In at least one embodiment of the disclosure, the first position indication information includes first indication information and second indication information. The first indication information is configured to indicate frequency-domain reference physical resource blocks including the first resource sub-band on the frequency domain in the scheduling unit, and a subcarrier spacing of each frequency-domain reference physical resource block is a multiple of a maximum subcarrier spacing preconfigured by a system. The second indication information is specifically configured to indicate positions of the physical resource blocks of the first resource sub-band in a starting frequency-domain reference physical resource block indicated by the first indication information and positions of the physical resource blocks of the first resource sub-band in an ending frequency-domain reference physical resource block indicated by the first indication information.

In at least one embodiment of the disclosure, the first indication information is a first bit table. Each bit in the first bit table corresponds to each frequency-domain reference physical resource block in the scheduling unit, and first values of multiple continuous first bits in the first bit table indicate that the corresponding frequency-domain reference physical resource blocks include the physical resource blocks of the first resource sub-band.

In at least one embodiment of the disclosure, the first indication information is specifically configured to indicate a position of the starting frequency-domain reference physical resource block on the frequency domain and a position of the ending frequency-domain reference physical resource block on the frequency domain, or the second indication information is specifically configured to indicate the position of the starting frequency-domain reference physical resource block on the frequency domain and the number of the frequency-domain reference physical resource blocks including the first resource sub-band.

In at least one embodiment of the disclosure, the second indication information is a second bit table and a third bit table, each bit in the second bit table and the third bit table corresponds to a physical resource block in the first resource sub-band. A second value of a bit in the second bit table indicates that the corresponding physical resource block belongs to the starting frequency-domain reference physical resource block, and a third value of a bit in the third bit table indicates that the corresponding physical resource block belong to the ending frequency-domain reference physical resource block.

In at least one embodiment of the disclosure, when the first resource sub-band and a second resource sub-band in the multiple resource sub-bands are located in non-overlapped frequency-domain reference physical resource blocks on the frequency domain, fourth values of multiple continuous second bits in the first bit table indicate that the corresponding frequency-domain reference physical resource blocks include the physical resource blocks of the second resource sub-band on the frequency domain.

In at least one embodiment of the disclosure, when the first resource sub-band and the second resource sub-band in the multiple resource sub-bands are located in overlapped frequency-domain reference physical resource blocks on the frequency domain, the resource configuration information further includes a fourth bit table. Each bit in the fourth bit table corresponds to each frequency-domain reference physical resource block in the scheduling unit, and fifth values of multiple continuous third bits in the fourth bit table indicate that the corresponding frequency-domain reference physical resource blocks include the physical resource blocks of the second resource sub-band on the frequency domain.

In at least one embodiment of the disclosure, the first position indication information is specifically configured to indicate a starting physical resource block of the first resource sub-band on the frequency domain and the number of the physical resource blocks in the first resource sub-band, or the first position indication information is specifically configured to indicate the starting physical resource block of the first resource sub-band on the frequency domain and an ending physical resource block of the first resource sub-band on the frequency domain.

In at least one embodiment of the disclosure, indication of the starting physical resource block of the first resource sub-band on the frequency domain by the first position indication information includes the following. The first position indication information indicates a starting frequency-domain reference physical resource block and the position of the starting physical resource block in the starting frequency-domain reference physical resource block. The starting frequency-domain reference physical resource block is a frequency-domain reference physical resource block including the starting physical resource block on the frequency domain, indication of the ending physical resource block of the first resource sub-band on the frequency domain by the first position indication information includes the following. The first position indication information indicates an ending frequency-domain reference physical resource block and the position of the ending physical resource block in the ending frequency-domain reference physical resource block. The ending frequency-domain reference physical resource block is a frequency-domain reference physical resource block including the ending physical resource block on the frequency domain. The subcarrier spacing of the frequency-domain reference physical resource block is a multiple of the maximum subcarrier spacing preconfigured by the system.

It is to be understood that the terminal device 600 for data transmission according to the embodiment of the disclosure may correspond to the terminal device and terminal device 400 in the embodiments of the disclosure and may correspond to the terminal device executing the methods according to the embodiments of the disclosure. The abovementioned and other operations and/or functions of each unit in the terminal device 600 are adopted to implement the corresponding flows of the methods in FIG. 6 respectively and will not be elaborated herein for brief description.

It is to be understood that the operations and/or functions of each unit in the network device provided in the embodiments of the disclosure correspond to the network device in the method embodiments and interaction with the terminal device, the related characteristics, functions and the like correspond to the related characteristics and functions of the terminal device side, which will not be elaborated herein for brief description.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skilled in the art may realize that the units and algorithm operations of each example described in combination with the embodiments disclosed in the disclosure may be implemented by electronic hardware, computer software or a combination of the computer software and the electronic hardware. To clearly illustrate the interchangeability of hardware and software, various components and operations of each example have been generally described above in terms of the functionality. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system. In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Various equivalent modifications or replacements are apparent to those skilled in the art within the technical scope disclosed by the disclosure.

The invention claimed is:

1. A data transmission method, carried out by a terminal device, comprising:
receiving resource configuration information sent by a network device, the resource configuration information being configured to indicate multiple resource sub-bands for transmitting data in a scheduling unit, each of the multiple resource sub-bands being formed by continuous physical resource blocks in a frequency domain,
wherein the resource configuration information comprises first position indication information, the first position indication information is configured to indicate a starting physical resource block of a first resource sub-band in the frequency domain and a number of the physical resource blocks in the first resource sub-band, or the first position indication information is configured to indicate the starting physical resource block of the first resource sub-band in the frequency domain and an ending physical resource block of the first resource sub-band in the frequency domain; and
communicating the data with the network device on the multiple resource sub-bands according to the resource configuration information,
wherein the first position indication information is further configured to indicate a starting frequency-domain reference physical resource block and position of the starting physical resource block in the starting frequency-domain reference physical resource block, wherein the starting frequency-domain reference physical resource block is a frequency-domain reference physical resource block including the starting physical resource block in the frequency domain, and the starting physical resource block of the first resource sub-band in the frequency domain is determined based on an offset in the starting frequency-domain reference physical resource block.

2. The data transmission method of claim 1, wherein the scheduling unit is part of a system bandwidth or the whole system bandwidth.

3. The data transmission method of claim 1, wherein at least two resource sub-bands in the multiple resource sub-bands have different subcarrier spacings.

4. The data transmission method of claim 1, wherein the first position indication information is further configured to indicate an ending frequency-domain reference physical resource block and position of the ending physical resource block in the ending frequency-domain reference physical resource block, wherein the ending frequency-domain reference physical resource block is a frequency-domain reference physical resource block including the ending physical resource block in the frequency domain; and wherein
 a subcarrier spacing of each of the starting frequency-domain reference physical resource block and the ending frequency-domain reference physical resource block is a multiple of a maximum subcarrier spacing preconfigured by a system.

5. The data transmission method of claim 1, wherein communicating the data with the network device on the multiple resource sub-bands according to the resource configuration information comprises:
 communicating part of the data with the network device on the first resource sub-band according to the first position indication information.

6. A data transmission method, comprising:
 sending resource configuration information to a terminal device, the resource configuration information being configured to indicate multiple resource sub-bands for transmitting data in a scheduling unit, each of the multiple resource sub-bands being formed by continuous physical resource blocks in a frequency domain,
 wherein the resource configuration information comprises first position indication information, and the first position indication information is configured to indicate a starting physical resource block of a first resource sub-band in the frequency domain and a number of the physical resource blocks in the first resource sub-band, or the first position indication information is configured to indicate the starting physical resource block of the first resource sub-band in the frequency domain and an ending physical resource block of the first resource sub-band in the frequency domain; and
 communicating the data with the terminal device on the multiple resource sub-bands according to the resource configuration information,
 wherein the first position indication information is further configured to indicate a starting frequency-domain reference physical resource block and position of the starting physical resource block in the starting frequency-domain reference physical resource block, wherein the starting frequency-domain reference physical resource block is a frequency-domain reference physical resource block including the starting physical resource block in the frequency domain, and the starting physical resource block of the first resource sub-band in the frequency domain is determined based on an offset in the starting frequency-domain reference physical resource block.

7. The data transmission method of claim 6, wherein the scheduling unit is part of a system bandwidth or the whole system bandwidth.

8. The data transmission method of claim 6, wherein at least two resource sub-bands in the multiple resource sub-bands have different subcarrier spacings.

9. The data transmission method of claim 6, wherein the first position indication information is further configured to indicate an ending frequency-domain reference physical resource block and position of the ending physical resource block in the ending frequency-domain reference physical resource block, wherein the ending frequency-domain reference physical resource block is a frequency-domain reference physical resource block including the ending physical resource block in the frequency domain; and wherein
 a subcarrier spacing of each of the starting frequency-domain reference physical resource block and the ending frequency-domain reference physical resource block is a multiple of a maximum subcarrier spacing preconfigured by a system.

10. The data transmission method of claim 6, wherein communicating the data with the terminal device on the multiple resource sub-bands according to the resource configuration information comprising:
 communicating part of the data with the terminal device on the first resource sub-band according to the first position indication information.

11. A terminal device for data transmission, comprising: a processor, a memory and a transceiver, the processor, the memory and the transceiver communicating with one another through an internal connecting path; wherein
 the memory is configured to store an instruction;
 the processor is configured to execute the instruction stored in the memory to:
 receive resource configuration information sent by a network device, the resource configuration information being configured to indicate multiple resource sub-bands for transmitting data in a scheduling unit, each of the multiple resource sub-bands being formed by continuous physical resource blocks in a frequency domain,
 wherein the resource configuration information comprises first position indication information, the first position indication information is configured to indicate a starting physical resource block of a first resource sub-band in the frequency domain and a number of the physical resource blocks in the first resource sub-band, or the first position indication information is configured to indicate the starting physical resource block of the first resource sub-band in the frequency domain and an ending physical resource block of the first resource sub-band in the frequency domain; and
 communicate the data with the network device on the multiple resource sub-bands according to the resource configuration information,
 wherein the first position indication information is further configured to indicate a starting frequency-domain reference physical resource block and position of the starting physical resource block in the starting frequency-domain reference physical resource block, wherein the starting frequency-domain reference physical resource block is a frequency-domain reference physical resource block including the starting physical resource block in the frequency domain, and the starting physical resource block of the first resource sub-band in the frequency domain is determined based on an offset in the starting frequency-domain reference physical resource block.

12. The terminal device of claim 11, wherein the scheduling unit is part of a system bandwidth or the whole system bandwidth.

13. The terminal device of claim 11, wherein at least two resource sub-bands in the multiple resource sub-bands have different subcarrier spacings.

14. The terminal device of claim 11, wherein the first position indication information is further configured to indicate an ending frequency-domain reference physical resource block and position of the ending physical resource block in the ending frequency-domain reference physical resource block, wherein the ending frequency-domain reference physical resource block is a frequency-domain reference physical resource block including the ending physical resource block in the frequency domain; and wherein a subcarrier spacing of each of the starting frequency-domain reference physical resource block and the ending frequency-domain reference physical resource block is a multiple of a maximum subcarrier spacing preconfigured by a system.

15. The terminal device of claim 11, wherein the processor is configured to:

communicate part of the data with the network device on the first resource sub-band according to the first position indication information.

16. A network device for data transmission, comprising: a processor, a memory and a transceiver, the processor, the memory and the transceiver communicating with one another through an internal connecting path; wherein the memory is configured to store an instruction;

the processor is configured to execute the instruction stored in the memory to perform the data transmission method of claim 6.

* * * * *